United States Patent [19]

Schulze

[11] 4,070,341

[45] Jan. 24, 1978

[54] STABILIZED ETHYLENE-CHLOROTRIFLUOROETHYLENE POLYMERS EXHIBITING REDUCED METAL CORROSION

[75] Inventor: Stephen R. Schulze, Gillette, N.J.

[73] Assignee: Allied Chemical Corporation, Morris Township, N.J.

[21] Appl. No.: 751,001

[22] Filed: Dec. 15, 1976

[51] Int. Cl.$^2$ .............................. C08K 3/30; C08K 5/13
[52] U.S. Cl. ....................... 260/45.75 V; 260/45.95 B; 260/837 R; 428/339; 428/463; 174/110 FC; 260/837 PV
[58] Field of Search .................. 260/45.75 V, 45.95 B; 174/110 FC; 428/339, 463

[56] References Cited

U.S. PATENT DOCUMENTS

| | | | |
|---|---|---|---|
| 2,651,521 | 1/1953 | Fischer et al. | 260/45.95 B |
| 2,912,397 | 11/1959 | Houska et al. | 260/45.75 V |
| 2,993,875 | 7/1961 | Maddock | 260/42.56 |
| 3,075,940 | 1/1963 | Pazinski et al. | 260/45.95 B |
| 3,255,136 | 6/1966 | Hecker et al. | 260/45.95 |
| 3,745,145 | 7/1973 | Khattab et al. | 260/45.75 W |
| 3,903,045 | 9/1975 | Chandrasekaran et al. | 260/45.75 V |

OTHER PUBLICATIONS

Associated Lead Manufacturer's Limited, Data Sheet No. 12, Tribasic Lead Sulphate (1965).

*Primary Examiner*—V.P. Hoke
*Attorney, Agent, or Firm*—Roger H. Criss; Alan M. Doernberg

[57] ABSTRACT

Stabilized fluoropolymer compositions comprising a polymer from about 40 to 60 mol percent ethylene, about 60 to 40 mol percent chlorotrifluoroethylene and optionally about 0.1 to 10 mol percent of a fluorinated termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, and as a stabilizing agent, a member selected from the group consisting of epoxy resins, mixtures of tribasic lead sulfate and bisphenol A, and mixtures of the epoxy resin, tribasic lead sulfate and bisphenol A.

7 Claims, No Drawings

4,070,341

STABILIZED ETHYLENE-CHLOROTRIFLUOROETHYLENE POLYMERS EXHIBITING REDUCED METAL CORROSION

BACKGROUND OF THE INVENTION

1. Field of the Invention

This invention relates to compositions of ethylene-chlorotrifluoroethylene polymers which are heat stabilized and which exhibit reduced metal corrosion.

2. Description of the Prior Art

Polymers of from about 40 to 60 mol percent ethylene, about 60 to 40 mol percent chlorotrifluoroethylene and optionally about 0.1 to 10 mol percent of 3,3,3-trifluoro-2-trifluoromethyl propene, certain vinyl monomers and mixtures thereof exhibit outstanding mechanical, electrical and chemical properties. In order to stabilize ethylene-chlorotrifluoroethylene copolymers against degradation and use at elevated temperatures, it has been suggested in U.S. Pat. No. 3,745,145 to Khattab et al. to incorporate a stabilizing system comprising (a) a phosphite of an organic polyhydric phenol, (b) a salt of a carboxylic acid and a metal of Group II of the Periodic Table and (c) a thio dipropionic acid ester or alkali metal salt. It has been further proposed in U.S. Pat. No. 3,773,698 to Khattab to further incorporate into such stabilizing system an alkaline earth metal oxide.

Although it has been found that the above-described stabilizing systems provide excellent resistance to degradation during melt processing as well as in many end-use applications, it has been discovered that some degradation occurs when wire and cable constructions provided with a coating of the copolymer are heated at elevated temperatures for considerable periods of time. Such problem is especially recognized in silver-plated copper wire constructions which are subjected to such thermal environments as 205° C for three days. When the fluoropolymer coating is removed from the construction for splicing, soldering or other purposes, a red corrosion product is present on the surface of the silver plating. Such corrosion product may adversely affect electrical properties in some applications and may also prevent good electrical contact when soldered connections are made.

It would be desirable if there were provided a stabilizer system for such polymers which reduced metal corrosion, especially in wire and cable applications, without discoloring the resin when subjected to elevated temperatures. Typically, the fluoropolymer coating is color-coded for facilitating connections and thus it is important to retain the color-coding integrity of the coating.

SUMMARY OF THE INVENTION

In accordance with this invention, there is provided a stabilized fluoropolymer composition comprising a polymer of from about 40 to 60 mol percent ethylene, about 60 to 40 mol percent chlorotrifluoroethylene and optionally about 0.1 to 10 mol percent of a fluorinated termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, and as a stabilizing agent, mixture of tribasic lead sulfate and bisphenol A.

It has been surprisingly found that the presence of the stabilizing agents of this invention very significantly reduces the presence of the red corrosion product on silver-plated copper wires and does not discolor the fluoropolymer. The fluoropolymer composition is stable under melt processing conditions and is also stable under high temperature environments for considerable periods of time.

DESCRIPTION OF THE PREFERRED EMBODIMENTS

As pointed out above, copolymers of ethylene-chlorotrifluoroethylene are known in the art. These copolymers are disclosed, for example, in the aforementioned patents, as well as in U.S. Pat. No. 2,392,375 to Hanford and U.S. Pat. Nos. 3,371,076 and 3,501,446 to Ragazzini. Terpolymers of ethylene, chlorotrifluoroethylene and 3,3,3-trifluoro-2-trifluoromethyl propene are disclosed, for example, in U.S. Pat. No. 3,847,881 to Mueller et al. Terpolymers wherein the termonomer is the aforesaid vinyl monomer are disclosed, for example, in U.S. Pat. No. 3,624,250 to Carlson.

By "free of telogenic activity" is meant that the vinyl monomer does not act as a chain transfer agent to an extent which undesirably limits the molecular weight of the copolymer. Examples of such vinyl monomers include fluorinated alpha-monoolefins and those of the following formulae:

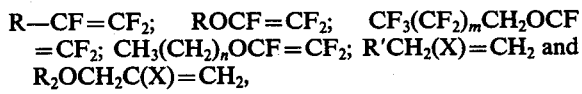

$R-CF=CF_2$; $ROCF=CF_2$; $CF_3(CF_2)_mCH_2OCF=CF_2$; $CH_3(CH_2)_nOCF=CF_2$; $R'CH_2(X)=CH_2$ and $R_2OCH_2C(X)=CH_2$, wherein R is an organic group containing 2 to 8 carbon atoms, R' is a perfluorinated or chlorofluoroalkyl group of 1 to 7 carbon atoms or a secondary or tertiary haloalcohol group, $R_2$ is a perfluorinated or chlorofluoroalkyl of 1 to 7 carbon atoms, X is H or $CH_3$, $m$ is an integer of 0 to 6 and $n$ is an integer of 1 to 7. Especially preferred vinyl monomers are perfluoropropyl perfluorovinyl ether, 1,1,1-trifluoro-2-(trifluoromethyl)-4-penten-2-ol and an allyl heptafluoroisopropyl ether.

Preferably, the copolymer of this invention comprises about 45 to 55 mol percent of ethylene and correspondingly about 55 to 45 mol percent of chlorotrifluoroethylene and most preferably about equimolar quantities of ethylene and chlorotrifluoroethylene units are present in the copolymer. The terpolymers of this invention preferably comprise about 0.5 to 5 mol percent of the above termonomers and preferably the termonomer is 3,3,3-trifluoro-2-trifluoromethyl propene.

The ethylene-chlorotrifluoroethylene co- or terpolymers may be formed with varying amounts of high and low molecular weight components in order to provide increased stress-crack resistance, as is disclosed in U.S. applications Ser. Nos. 564,232, filed Apr. 2, 1975 now U.S. Pat. No. 4,020,253 and 649,936, filed Jan. 19, 1976 now U.S. Pat. No. 4,033,939. The latter application also discloses terpolymers wherein the termonomer is a mixture of 3,3,3-trifluoro-2-trifluoromethyl propene and the vinyl monomers.

In accordance with this invention, it has been found that certain stabilizers effectively reduce the tendency for such polymers to form corrosion products on metals when subjected to elevated temperatures for long durations. Specifically, it has been found that mixtures of tribasic lead sulfate and bisphenol A (2,2-bis(4-hydroxyphenol) propane) are effective stabilizers to prevent corrosion in silver-plated copper wires and do so without discoloring the copolymer. This is surprising since it has also been found that the individual components by themselves are not effective stabilizers. Mixtures may contain from about 10 to 90 weight percent of the tribasic lead sulfate and about 90 to 10 percent of bisphenol A, preferably about 25 to 75 percent of the tribasic lead sulfate and about 75 to 25 percent of the bisphenol A.

It has also been discovered that epoxy resins are effective stabilizers for such polymers at elevated temperatures. The polyepoxides can be saturated or unsaturated, aliphatic, cycloaliphatic, heterocylic, aromatic and may be substituted with bromine, chlorine, hydroxyl, ether radicals and the like. Any of the well known epoxy resins may be employed such as the epoxy novolacs, including epoxidized o-cresol novolacs such as the polyglycidyl ether of o-cresol formaldehyde novolac and epoxidized phenol novolacs, such as the di- or polyglycidyl ethers of phenol formaldehyde novolac, the di- and polyglycidyl ethers of bisphenol A and brominated versions thereof. Especially preferred is the diglycidyl ether of bisphenol A. Mixtures of the epoxy resin, tribasic lead sulfate and bisphenol A may also be employed.

The stabilizing agents of this invention are present in stabilizing-effective amounts. Preferably, the stabilizers are present in amounts ranging from about 0.1 to 10 weight percent, more preferably about 0.3 to 5 weight percent based on the total weight of the composition.

The stabilizers are admixed with the polymer using any conventional mechanical procedure and may be added in solution or preblended with the polymer. Preferably, the blended mixtures is passed through an extruder and the extruded rod is chopped into pellets of desired size.

The following non-limiting examples further describe the present invention. All parts and percentages are by weight unless otherwise indicated.

EXAMPLE 1

A blend of 1 percent tribasic lead sulfate, 0.5 percent bisphenol A and 98.5 percent of an equimolar ethylene-chlorotrifluoroethylene copolymer was prepared by tumbling the powders for about two hours. The blends were then extruded and pelletized and the composition was thereafter extruded onto a 20 AWG silver-plated copper wire to a thickness of about 10 mils. The wires were then thermally aged at 180° C for 7 days. When the resin coating was stripped, no red corrosion product was noticed and the wire maintained its silvery appearance; the silver did not strip off with the resin.

EXAMPLE 2

A blend was prepared by dissolving in acetone an epoxy resin (diglycidyl ether of bisphenol A) having an epoxide equivalent weight of 175 (4.5 grams resin per 100 cc solvent) and the solvent was added to an equimolar ethylene-chlorotrifluoroethylene copolymer to provide a 1 percent by weight level of epoxy. The mixture was tumbled for 1 hour and then heated at 70° C under a nitrogen blanket to remove an acetone. The blend was then extrusion compounded and extruded onto a 20 AWG silver-plated copper wire to a thickness of about 10 mils. The wire was also subjected to thermal aging at 180° C for 7 days. None of the red corrosion product was present when the resin coating was stripped off, although the wire was somewhat darkened when compared with Example 1.

EXAMPLE 3 (Comparative)

An equimolar copolymer of ethylene-chlorotrifluoroethylene was tumbled with a stabilizing system of 0.225 percent phosphite of 4,4-n-butylidene-bis-(6-tertbutyl-m-cresol), 0.075 percent zinc-2-ethylhexylate and 0.15 percent distearylthiodipropionate. The composition was extruded onto a 20 AWG silver-plated copper wire to a thickness of about 10 mils and the wire was thermally aged at 180° C for 7 days. When the jacket was stripped off from the wire, the silver layer was completely removed with the resin coating and the presence of the red corrosion product, believed to be copper oxide, was noticed on the copper layer.

EXAMPLES 4-8

Various blends of additives and ethylene-chlorotrifluoroethylene copolymer were prepared and compression molded into 63 mil thick plaques containing a 20 AWG braided copper and a 20 AWG braided silver-plated copper wire. The plaques were thermally aged at 180° C for 3 days and the wires were removed for inspection by splicing the plaques open. The major characteristics preferred were untarnished silver appearance and undiscolored resin. The results are shown in Table I, below.

TABLE I

| Example | Stabilizer, Wt. Percent | Wire Aging | Resin Color |
|---|---|---|---|
|  | none | Ag removed | white |
| 5 | 1% tribasic lead sulfate + 0.5% bisphenol A | Ag very slightly dulled | off-white |
| 6 | 1% tribasic lead sulfate | Ag severely dulled | white |
| 7 | 1% epoxy | Ag slightly dulled | off-white |
| 8 | stabilizer C + 1% CaO | Ag removed Brown spots on Cu | white |

In the Table, in Example 7, the epoxy resin was a diglydicyl ether of bisphenol A having an epoxide equivalent weight of 178. In Example 8, stabilizer C was the same system as employed in Example 3.

As can be seen from Table I, the combination of tribasic lead sulfate and bisphenol A as well as epoxy produced excellent stability when the wires were aged for 3 days at 180° C without an adverse significant effect on color. In contradistinction, when no stabilizer or the stabilizing systems of the aforementioned Khattab patents were employed, the silver was removed or severely dulled. In addition, when the stabilizer comprised tribasic lead sulfate per se, the silver was also severely dulled.

EXAMPLES 9-17

The corrosion characteristics of ethylene-chlorotrifluoroethylene copolymers were determined by the mirror corrosion test specified in Western Electric Specification KS-1700. In this test, a thin metal film is exposed to gaseous materials emanating from heated resin. The effect on the metal film is noted after a given exposure time.

The metal film (mirror) is in the form of a vacuum-deposited film (having a thickness equivalent to 10 ± 5% transmission of normal incident light of 5000 Angstroms) on a plane sheet of clear, transparent, polished glass measuring 1 inch by ¼ inches.

A compression-molded piece of test resin measuring ¼ × 1 × 1/16 inch, was placed in the bottom of a test tube, 12mm diameter and 8 inches high, and the metal mirror was suspended about 4 inches above the test piece. The tube was sealed with an aluminum foil-wrapped cork. The bottom two inches of the tube (which contains the resin) was placed in a heating block at the specified temperature. After 16 hours, the mirror was removed for visual inspection.

The results are shown in Table II below. In the Table, stabilizer A was 1% of a diglycidyl ether of bisphenol A having an epoxide equivalent weight of 175, stabilizer B was 1% tribasic lead sulfate and 0.5% bisphenol A, and stabilizer C was the same cooperative stabilizer as employed in Example 3.

TABLE II

| Example | Stabilizer | Temperature, °C | Copper | Silver |
|---------|------------|-----------------|--------|--------|
| 9       | A          | 150             | VSD    | NE     |
| 10      | B          | 150             | VSD    | NE     |
| 11      | C          | 150             | EF     | SD     |
| 12      | A          | 180             | VSD    | NE     |
| 13      | B          | 180             | SD     | NE     |
| 14      | C          | 180             | SA     | SD     |
| 15      | A          | 200             | OR     | NE     |
| 16      | B          | 200             | D      | VSD-SD |
| 17      | C          | 200             | SA     | EF     |

NE = No effect
VSD = Very slight discoloration
SD = Slight discoloration
D = Discoloration but no removal
OR = Overall reduction in thickness, but no complete removal
EF = Effective removal
SA = Severe attack As can be seen from Table II, the stabilizer systems of this invention result in significantly less attack of the metal coating at any given temperature than does the comparative stabilizer system. For example, at 200° C with the silver mirror, the epoxy stabilized resin had no effect on the metal coating and the tribasic lead sulfate-bisphenol A stabilized resin had a very slight to slight discoloration, whereas the comparative stabilized resin caused effective removal of the silver metal by corrosion. It can therefore be seen that the stabilizers of this invention provide approximately a 30° C advantage in preventing corrosion compared with the comparative stabilizer system according to this test.

EXAMPLE 18

Example 1 is repeated except that the polymer contains 3 mol percent 3,3,3-trifluoro-2-trifluoromethyl propene and equimolar amounts of ethylene and chlorotrifluoroethylene. Similar results are noted.

EXAMPLE 19

Example 18 is repeated except that the termonomer is perfluoropropyl perfluorovinyl ether. Similar results are noted.

EXAMPLE 20

Example 1 is repeated except that the stabilizing system includes 1% by weight of the epoxy resin of Example 2. Similar results are noted.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A stabilized fluoropolymer composition comprising a polymer of from about 40 to 60 mol percent ethylene, about 60 to 40 mol percent chlorotrifluoroethylene, optionally about 0.1 to 10 mol percent of a fluorinated termonomer selected from the group consisting of 3,3,3-trifluoro-2-trifluoromethyl propene, a vinyl monomer which is free of telogenic activity and which provides a side chain having at least two carbon atoms, the side chain being aromatic or having its elements bonded by a single bond only, and mixtures thereof, and as stabilizing agent, a mixture of tribasic lead sulfate and bisphenol A.

2. The composition of claim 1 wherein said stabilizing agent comprises from about 10 to 90 percent tribasic lead sulfate and from about 90 to 10 percent bisphenol A.

3. The composition of claim 2 wherein said stabilizing agent is present in an amount of about 0.1 to 10 percent based on the weight of the composition.

4. The composition of claim 1 wherein said polymer is an approximately equimolar copolymer of ethylene and chlorotrifluoroethylene.

5. The composition of claim 1 wherein said polymer comprises from about 0.5 to 5 mol percent of 3,3,3-trifluoro-2-trifluoromethyl propene.

6. A wire provided with a covering of the composition of claim 1.

7. A wire in accordance with claim 6 wherein said wire is a silver-plated copper wire.

* * * * *

UNITED STATES PATENT AND TRADEMARK OFFICE
CERTIFICATE OF CORRECTION

PATENT NO. : 4,070,341
DATED : January 24, 1978
INVENTOR(S) : Stephen R. Schulze It is certified that error appears in the above-identified patent and that said Letters Patent are hereby corrected as shown below:

Column 4, line 32, insert -- 4 -- under Example.

Column 6, line 24, after "chlorotrifluoroethylene" insert -- and --.

Signed and Sealed this

Nineteenth Day of December 1978

[SEAL]

Attest:

RUTH C. MASON
Attesting Officer

DONALD W. BANNER
Commissioner of Patents and Trademarks